United States Patent
Lam

(10) Patent No.: US 7,055,086 B2
(45) Date of Patent: May 30, 2006

(54) METHOD AND APPARATUS FOR PROTECTING PARTS OF A PACKET IN A WIRELESS NETWORK

(75) Inventor: Alex C. K. Lam, Chatswood (AU)

(73) Assignee: Cisco Technology, Inc., San Jose, CA (US)

( * ) Notice: Subject to any disclaimer, the term of this patent is extended or adjusted under 35 U.S.C. 154(b) by 221 days.

(21) Appl. No.: 10/819,771

(22) Filed: Apr. 6, 2004

(65) Prior Publication Data

US 2005/0226190 A1    Oct. 13, 2005

(51) Int. Cl.
    *H03M 13/00* (2006.01)
(52) U.S. Cl. .................................... 714/776
(58) Field of Classification Search .......... 714/776
    See application file for complete search history.

(56) References Cited

U.S. PATENT DOCUMENTS

| | | | | |
|---|---|---|---|---|
| 5,832,497 | A | 11/1998 | Taylor | 707/104.1 |
| 6,006,225 | A | 12/1999 | Bowman et al. | 705/5 |
| 6,144,944 | A | 11/2000 | Kurtzman, II et al. | 705/14 |
| 6,185,558 | B1 | 2/2001 | Bowman et al. | 707/5 |
| 6,453,312 | B1 | 9/2002 | Goiffon et al. | 707/3 |
| 6,516,312 | B1 | 2/2003 | Kraft et al. | 707/3 |
| 6,564,213 | B1 | 5/2003 | Ortega et al. | 707/5 |
| 6,681,364 | B1 * | 1/2004 | Calvignac et al. | 714/776 |
| 6,804,220 | B1 * | 10/2004 | Odenwalder et al. | 370/337 |
| 2002/0038241 | A1 | 3/2002 | Hiraga | 705/14 |
| 2003/0046389 | A1 | 3/2003 | Thieme | 709/224 |
| 2003/0088525 | A1 | 5/2003 | Velez et al. | 705/400 |

OTHER PUBLICATIONS

M. Balabanovic et al., "Content-Based, Collaborative Recommendation", Communications of the ACM vol. 40, No. 3, Mar. 1988, pp. 66-72.
H. Kawano et al., "Mondou: Web search engine with textual data mining", 0-7803-3905, IEEE, Mar. 1997, pp. 402-405.
M. Tanaka et al., "Intelligent System for Topic Survey in MEDLINE by Keyword Recommendation and Learning Text Characteristics", Genome Informatics 11: 73-82, 2000, pp. 73-82.
U.S. Appl. No. 10/417,709, filed Apr. 16, 2003, Chand.

* cited by examiner

*Primary Examiner*—Shelly Chase
(74) *Attorney, Agent, or Firm*—Dov Rosenfeld; Inventek

(57) ABSTRACT

Disclosed herein are a method, an apparatus, and a carrier medium including one or more computer readable code segments to instruct one or more processors of a processing system to implement a method. The method is in a first wireless station of a wireless network. The method comprises generating a check sequence to protect the integrity of a subpacket of a packet, wherein the packet is to be wirelessly transmitted. The method further comprises embedding the check sequence in an embedding field within the packet. The embedding field is located prior to the end of the subpacket. The method further comprises wirelessly transmitting the packet. The check sequence is generated such that a second wireless station wirelessly receiving a signal corresponding to the packet can sequentially verify the integrity of the subpacket as if the check sequence were appended at the end of the subpacket being protected.

38 Claims, 11 Drawing Sheets

OFDM IEEE 802.11 PLCP Header

Rsv = Reserved
Par = Parity
L11 = Length[11]
S0 = Service[7]

METHOD AND APPARATUS FOR PROTECTING PARTS OF A PACKET IN A WIRELESS NETWORK

BACKGROUND

This invention relates to wireless packet-based networks, to wireless stations thereof, and in particular to error detection in packets by a wireless station of a wireless network such as a wireless local area network (WLAN).

There have been a number of techniques developed to detect and correct errors in transmissions. Error-correcting codes (ECCs) and error-detecting codes (EDC) are two classes of methods developed to overcome the problem of transmission errors. ECCs provide enough redundant information such that errors in transmission (up to a certain tolerance) can not only be detected, but can automatically be corrected in a receiver without retransmission. EDCs provide enough redundant information such that a receiver can detect errors in a transmission.

Wireless networks such as wireless data networks typically wirelessly transmit information as discrete bundles of data, otherwise known as packets. Packets have a structure that is typically defined by a specification or standard, and a packet structure is usually a composition and/or hierarchy of discrete units of data. It is common in the art to use ECC and EDC methods to protect specific parts of a packet, e.g., to protect subpackets of a packet. For wireless networks such as those conforming to one of the variants or derivatives of the IEEE 802.11 standard, parity bits and polynomial or Cyclic Redundancy Check (CRC) codes are commonly used to protect subpackets of a packet.

There is a desire in the art to protect specific parts of a packet, even in ways not directly provided for by the communication standard that the packet conforms to. For example, the IEEE 802.11 standard provides a 1-bit parity check to protect the SIGNAL field of the PLCP header. A 1-bit parity check is insufficient to protect against a large percentage of the possible transmission errors. See for example, U.S. patent application Ser. No. 10/629,383 filed Jul. 28, 2003 to inventors Keaney, et al., titled "EARLY DETECTION OF FALSE START-OF-PACKET TRIGGERS IN A WIRELESS NETWORK NODE," and assigned to the assignee of the present invention, that describes the inclusion in the physical layer header of a packet for transmission information that helps protect the integrity of such a header and that provides for a matching receiver to quickly determine whether or not a start of packet trigger is a false start of packet trigger. U.S. patent application Ser. No. 10/629,383 is incorporated herein by reference.

As another example, protecting the medium access controller (MAC) header part of an IEEE 802.11 MAC frame is valuable because the MAC processor of receiving station can use an integrity check on the MAC header to determine whether or not to process remaining parts of the MAC frame. Unfortunately the standard only provide protection in the form a polynomial (CRC) code to the entire MAC frame which-includes-both the MAC header and the MAC payload. By the time a traditional integrity check can be calculated, it may becomes no longer necessary or useful to determine the integrity of the MAC header alone.

One solution to this problem is to use reserved fields or bits of a packet to store one or more additional check sequences. Many network standards and protocols define packet structures with reserved field. For example, the IEEE 802.11 standard defines a part of the packet, the SERVICE field in the PLCP header, to be comprised of unused bits that are normally set to zero. A check sequence can be computed to protect the SIGNAL field and the MAC header and the resultant value placed in the unused bits of the SERVICE field. See above-mentioned U.S. patent application Ser. No. 10/629,383.

However, check sequences are typically appended to the end of the subpacket that is to be protected, especially those systems using polynomial (CRC) modules. Extra steps must be taken to embed and verify a check sequence in an arbitrary region of a packet, e.g., before the end subpacket that is to be protected. To handle a check sequence, both the wireless transmitter and the wireless receiver must perform extra steps, usually by buffering and/or reformatting parts of the packet. For wireless stations that are trying to minimize complexity in design and/or save material costs, such extra steps are highly undesirable.

Thus there is a need in the art for a method and apparatus to protect a subpacket with a check sequence, such that a receiver receiving a subpacket with a check sequence can sequentially verify the subpacket without executing extra steps to manipulate or process the check sequence.

SUMMARY

Disclosed herein are a method and a carrier medium including one or more computer readable code segments to instruct one or more processors of a processing system to implement a method. The method is in a first wireless station of a wireless network. The method comprises generating a check sequence to protect the integrity of a subpacket of a packet, wherein the packet is to be wirelessly transmitted. The method further comprises embedding the check sequence in an embedding field within the packet. The embedding field is located prior to the end of the subpacket. The method further comprises wirelessly transmitting the packet. The check sequence is generated such that a second wireless station wirelessly receiving a signal corresponding to the packet can-sequentially verify the integrity of the subpacket as if the check sequence were appended at the end of the subpacket being protected, such as would occur with a typical polynomial, e.g., CRC verifier that assumes there is a check sequence appended at the end. Thus, a prior art polynomial, e.g., CRC verifier can verify such a check sequence. By this is included the case that the second wireless station can serially verify the integrity of the subpacket without needing to process the check sequence more than once, i.e. more than when first encountered. By this is also included the case that the second wireless station can verify the integrity of the subpacket without needing to storing, e.g., to buffer the embedded check sequence. All these cases are meant to be included in the phrase "sequentially verify the integrity of the subpacket as if the check sequence were appended at the end of the subpacket being protected."

Also disclosed herein is an apparatus in a first wireless station of a wireless network. The apparatus comprises a processing unit. The processing unit includes a wireless transceiver coupled to an antenna. The processing unit is arranged to wirelessly transmit a packet, wherein the packet includes a subpacket. The apparatus further comprises a check sequence generator coupled to the processing unit. The check sequence generator generates a check sequence to protect the integrity of the subpacket. The check sequence generator is further arranged to embed the check sequence in an embedding field within the packet. The check sequence generator generates the check sequence such that a second wireless station wirelessly receiving a signal corresponding to the packet can sequentially verify the integrity of the subpacket as if the check sequence were appended at the end of the subpacket being protected as if the check sequence were appended at the end of the subpacket being protected.

Also disclosed herein are a first method and a carrier medium including one or more computer readable code segments to instruct one or more processors of a processing system to implement a first method. The first method is in a first wireless station of a wireless network. The first method comprises wirelessly receiving a signal corresponding to a packet wirelessly transmitted by a second wireless station. The packet includes a subpacket and a check sequence. The check sequence is in an embedding field within the packet. The embedding field is located prior to the end of the subpacket. The first method further comprises verifying the integrity of the subpacket, the verifying at least using the check sequence. The check sequence was generated by a second method in the second wireless station. The second method comprises generating a check sequence to protect the integrity of a subpacket. The second method further comprises embedding the check sequence in an embedding field. The second method further comprises wirelessly transmitting the packet. The check sequence is generated such that the first wireless station can sequentially verify the integrity of the subpacket as if the check sequence were appended at the end of the subpacket being protected as if the check sequence were appended at the end of the subpacket being protected.

Also disclosed herein is an apparatus in a first wireless station of a wireless network. The apparatus comprises a processing unit including a wireless transceiver coupled to an antenna. The processing unit is arranged to wirelessly receive a signal corresponding to a packet wirelessly transmitted by a second wireless station. The packet-includes a subpacket and a check sequence. The check sequence is in an embedding field within the packet. The embedding field is located prior to the end of the subpacket. The apparatus further comprises a subpacket verifier coupled to the processing unit. The subpacket verifier is arranged to verify the integrity of the subpacket, the verifying at least using the check sequence. The check sequence was generated by a method in the second wireless station. The method comprises generating a check sequence to protect the integrity of a subpacket. The method further comprises embedding the check sequence in the embedding field. The method further comprises wirelessly transmitting the packet. The check sequence is generated such that the first wireless station can sequentially verify the integrity of the subpacket as if the check sequence were appended at the end of the subpacket being protected as if the check sequence were appended at the end of the subpacket being protected.

DETAILED DESCRIPTION

Technology Background

Typical Wireless Apparatus

Transmissions in a wireless data network are typically organized into a number of layers such as those found in the International Standards Organization (ISO)/Open Systems Interconnect (OSI) network model. The two lowest layers, called the physical (PHY) layer and the data link layer respectively, are usually implemented in some variation of the apparatus shown in FIG. 1. The PHY layer typically manages the raw transmissions at the physical level, e.g., the electromagnetic level, and converts such raw transmissions to and from bits of data. Such bits of data may be organized into packets. The data link layer typically provides management and control information for the data stream such as some of the error management for the PHY layer, flow synchronization information and flow control information. For wireless networks that use multi-access transmission channels such as wireless local area networks (WLANS), the data link layer is often subdivided to include a medium access control (MAC) sublayer. The MAC sublayer, while considered by some to also encompass some aspects of the PHY layer, is considered here to be at the next layer up from the PHY layer.

Figure 1:
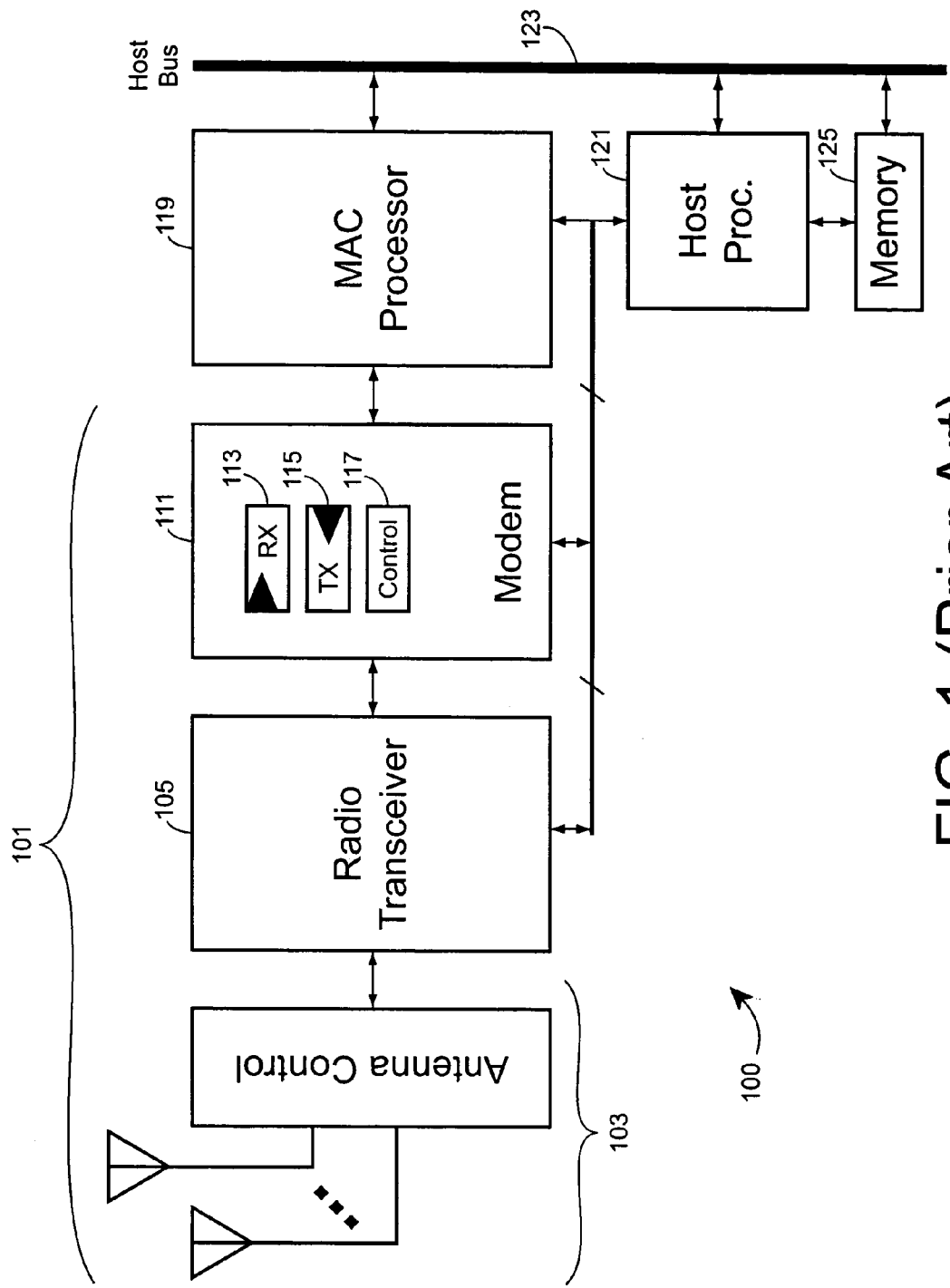
FIG. 1 shows a simplified block diagram of an apparatus in which aspects of the present invention may be embodied. While the apparatus of FIG. 1 is labeled as prior art, such an apparatus when it embodies one or more aspects of the present invention is not prior art.

FIG. 1 shows a simplified block diagram of one embodiment of an apparatus in which aspects of the present invention may be embodied. While the apparatus of FIG. 1 is labeled as prior art, such an apparatus when it embodies one or more aspects of the present invention is not prior art. The apparatus is logically subdivided into two separate components that respectfully handle the physical layer and MAC sublayers of wireless data transmissions. Of course, these two layers/sublayers may physically be handled by one piece of hardware. The apparatus is typical and, for example, may be implemented in a PCMCIA wireless local area network (LAN) card, a mini-PCI card, or in an access point of a wireless network.

The apparatus 100 includes a physical (PHY) layer interface processor 101. The PHY 101 is shown here logically separated into an antenna subsystem 103, a radio transceiver 105, and a modem 111. The antenna subsystem 103 includes at least one antenna for the frequency of service, e.g., approximately 2.4 GHz and/or approximately 5 GHz for the one of the present IEEE 802.11 standards. The antenna subsystem 103, in the case of half-duplex operation, typically includes a transmit/receive switch, and for the case of switched diversity, typically includes a diversity switch to select an antenna.

The antenna subsystem 103 is coupled to a radio transceiver 105. The radio transceiver 105 provides an analog received signal to and accepts an analog signal for transmission from a modem 111. The radio receiver of the transceiver can include a low-noise amplifier and/or receive radio frequency (RF) electronics. The radio transmitter part of the transceiver can include transmit RF electronics and/or a power amplifier.

The modem 111 includes a receiver part 113, e.g., an analog-to-digital converter to digitize samples of the received signal and a demodulator/decoder. The modem further includes a transmitter part 115, e.g., a digital-to-analog converter and a coder/modulator, and further includes a control part 117. For example, the control part 117 can implement start of packet (SOP) detection, automatic gain control, etc. The modem 111 can be coupled to the radio transceiver 105 via an analog interface for the received signal and the signal for transmission, and also via a digital interface for control signals and status flags.

The apparatus 100 further includes a medium access control (MAC) processor 119 for MAC processing. The MAC processor 119 accepts decoded/demodulated data from the modem 111, and provides data to be encoded/modulated to the modem 111. The MAC processor 119 is further connected to the modem 111 via another digital interface that provides access to the MAC processor 113 of various status flags and data registers in the modem 111.

The MAC processor 119 may optionally be coupled to a host processor 121 via a host bus subsystem 123. While FIG. 1 shows a separate host processor, the host processor function may optionally be incorporated with the MAC processor 119. A memory 125, e.g., a random access memory element (RAM), may be optionally included for program and/or data storage. The memory 125 is sometimes directly coupled to the host or to the MAC processor or to both. There may be additional memory, e.g., for buffering, and such additional memory can either be included in memory subsystem 125, or included in one or more components such as the MAC processor 119, or both. One or more interfaces may be included in apparatus 100, e.g., one or more interfaces that conform to well-known industry standard such as PCMCIA, PCI, USB, etc.

Note that FIG. 1 presents one implementation, and many alternate architectures may be used.

In some implementations, the transceiver, modem, and at least some of the MAC processor may be on the same processing unit, e.g., on the same chip.

IEEE 802.11 OFDM PLCP Header and MAC Frame

One embodiment of the invention is applicable to packets of a wireless network that conforms to one the OFDM variants of the IEEE 802.11 standard, e.g., transmitted and received packets that conform to one of the OFDM variants of the IEEE 802.11 standard.

At the PHY level, such an OFDM packet starts with a preamble that provides for start of packet detection, automatic gain control, diversity selection when diversity is used, various other synchronization functions, and channel estimation. The preamble is followed by a modulated part.

Figure 2A:
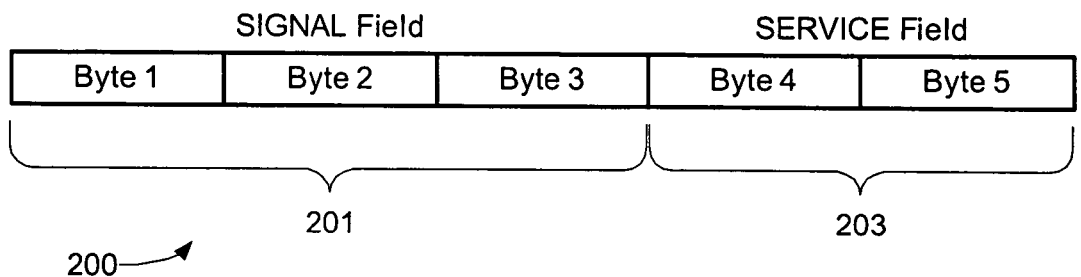
FIG. 2A shows a Physical Layer Control Protocol (PCLP) header that conforms exactly to the OFDM variants of the IEEE 802.11 standard.

FIG. 2A shows a Physical Layer Control Protocol (PCLP) header that conforms exactly to the OFDM variants of the IEEE 802.11 standard. FIG. 2A therefore is labeled "Prior Art." Some aspects of the present invention may be incorporated into such a header structure. In such a case, such a header is no longer prior art.

The PLCP header is the first part of the modulated payload. In FIG. 2A, the PCLP header 200 includes a 3-byte SIGNAL field 201 that is modulated at a low data rate. In particular, the SIGNAL field 201 is modulated at Binary Phase Shift Keying (BPSK) rate ½ and provides information about the packet, including the data rate at which the rest of the packet is encoded. The SIGNAL field 201 is followed by a 2-byte SERVICE field 203 that is modulated at the payload data rate specified in the SIGNAL field 201. The remainder of the modulated payload, called the PLCP Service Data Unit (PSDU), includes data at the payload data rate specified in the SIGNAL field 201.

Figure 2B:
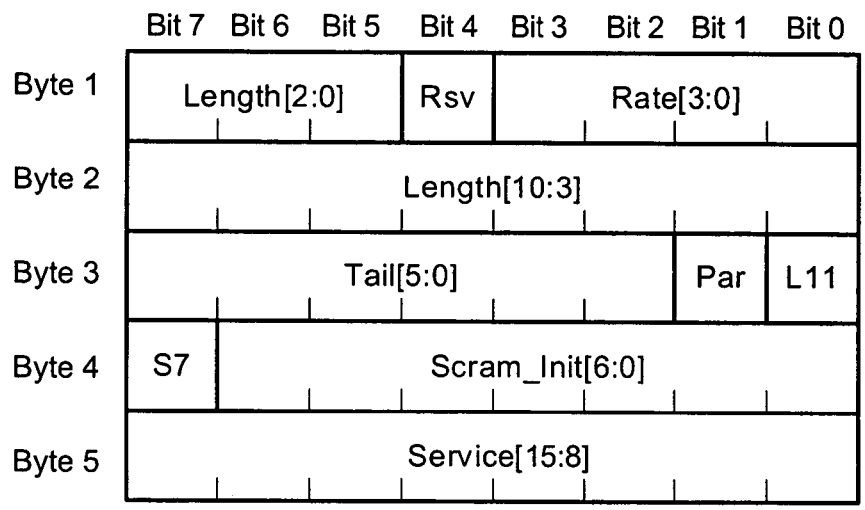
FIG. 2B shows the individual bits of the 5-byte PCLP header that conforms to the present-day OFDM variants of the IEEE 802.11 standard.

FIG. 2B shows the individual bits of the 5-byte PCLP header that conforms to the present-day OFDM variants of the IEEE 802.11 standard. FIG. 2B therefore is also labeled "Prior Art." Some aspects of the present invention may be incorporated into such a header structure. In such a case, such a header is no longer prior art.

In FIG. 2B, the SIGNAL field 201 includes a RATE field of 4 bits denoted Rate [0] through Rate [3] that provide information on the data rate. The RATE information determines the coding rate and the modulation method used for the modulated payload beyond the SIGNAL field 201. The RATE field is followed by a reserved bit that is always 0, and a 12-bit LENGTH field whose bits are denoted Length [0] through Length [11]. The LENGTH field is followed by an even parity bit. This is followed by 6-tail bits of the SIGNAL field denoted Tail [0] through Tail [5] that are unused bits that should be set to 0.

The three-byte SIGNAL field 201 is followed by the two-byte SERVICE field 203 that includes 7 random scrambler initialization bits denoted Scram_Init [0] through Scram_Init [6], and nine SERVICE field bits denotes Service [7] through Service [15]. The latter are unused bits that should all be zero to conform exactly to the OFDM IEEE 802.11 standards. The SERVICE field 203 is modulated at the same data rate as the rest of the packet specified by the RATE field.

Figure 3:
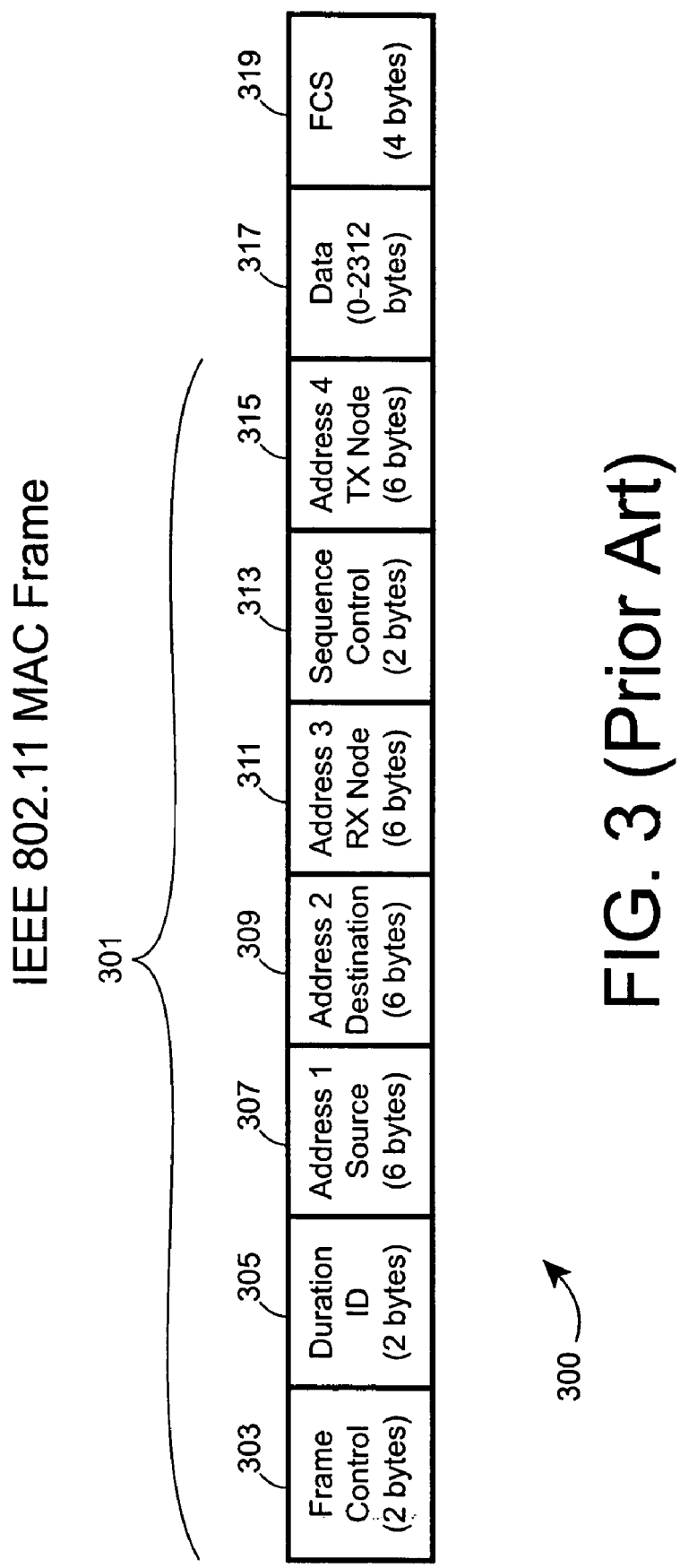
FIG. 3 shows a medium access control (MAC) frame including the MAC header that conforms to the IEEE 802.11 standard or a variant thereof.

FIG. 3 shows a MAC frame including the MAC header that conforms to the IEEE 802.11 standard or a variant thereof. FIG. 3 therefore is labeled "Prior Art." Some aspects of the present invention may be incorporated into such a structure. In such a case, such a structure is no longer prior art.

In FIG. 3, the MAC frame 300 includes the MAC header 301 of 30 bytes, the data field 303 containing the data payload of 0 to 2312 bytes, and a frame check sequence (FCS) field 319 of 4 bytes. The MAC header 301 includes a frame control field 303 of 2 bytes. The rest of the MAC header 301 includes a duration ID field 305 of 2 bytes, a source address field 307 of 6 bytes, a destination address field 309 of 6 bytes, a receiving station address field 311 of 6 bytes, a sequence control field 313 of 2 bytes, and a transmitting station address field 315 of 6 bytes. Various fields may not be included depending on the type of 802.11 MAC frame.

Appended Check Sequences for EDCs/ECCs

Aspects of the present invention relate to generating check sequences for a subpacket of a packet to protect the subpacket from wireless transmission errors. Additional aspects relate to verifying the integrity of a subpacket of a wirelessly received packet by using the check sequence located within the packet.

Figure 4:
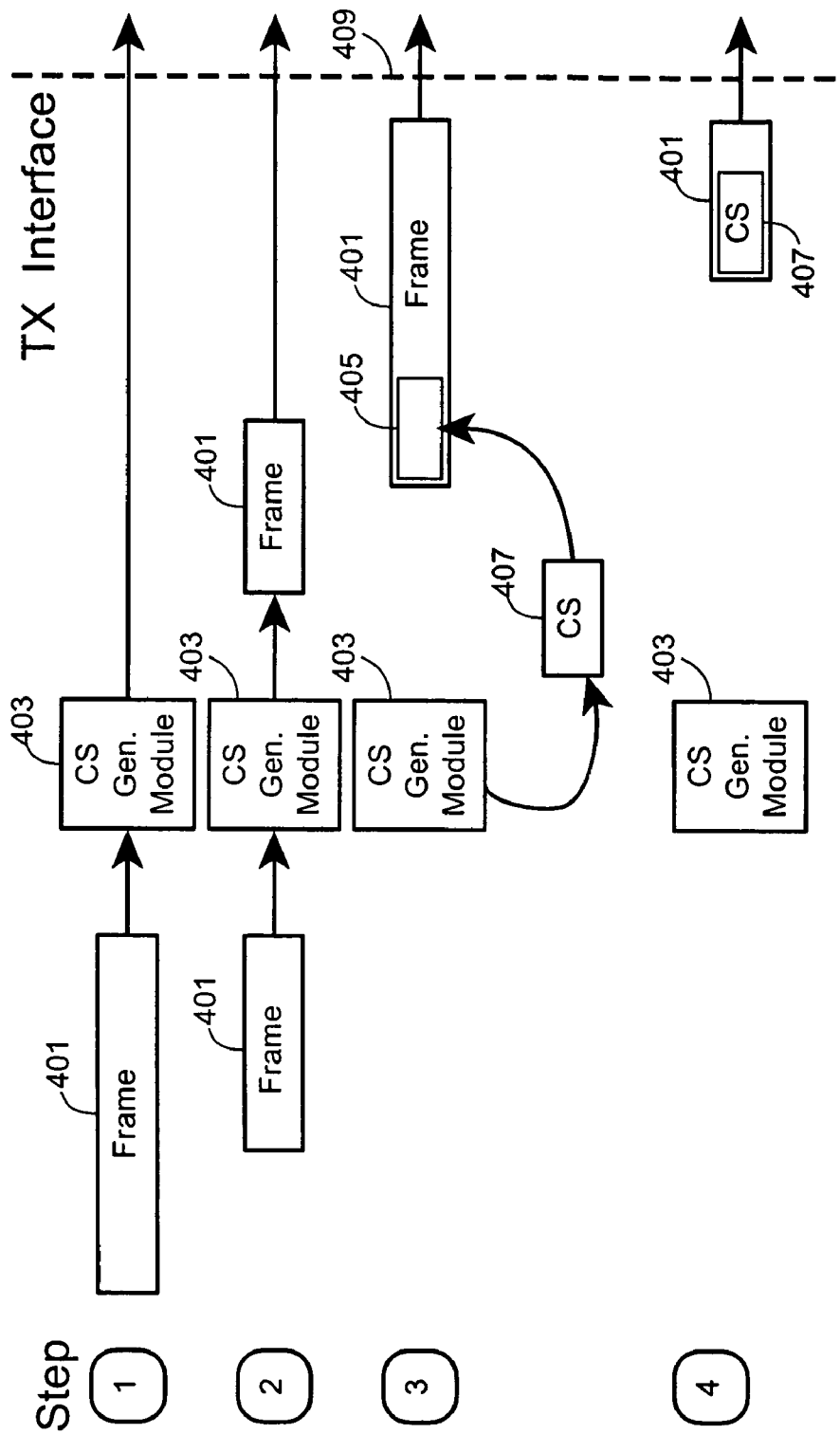
FIG. 4 shows a flow diagram of one embodiment of a method in a wireless transmitter for sequentially generating a check sequence for a subpacket of a packet and appending the check sequence to the end of the subpacket, the packet designated for wireless transmission.

FIG. 4 shows a flow diagram of a method in a wireless transmitter for sequentially generating a check sequence for a subpacket of a packet and appending the check sequence to the end of the subpacket, the packet designated for wireless transmission. Such a method can be used, for example, by a MAC processor to generate the FCS of a MAC frame and append the generated FCS to the end of the MAC frame.

In FIG. 4, a check sequence generator module 403 in a transmitter is notified that a subpacket 401 is ready to be processed. Before any processing takes place, the check sequence generator module 403 typically initializes its internal counters. The subpacket 401 is then fed into and processed by the check sequence generator module 403. As the subpacket 401 is processed, the check sequence 407 is computed. Fragments of the subpacket 401 that have been processed by check sequence generator module 403 may pass through the transmission interface 409 at this point. When the check sequence generator module 403 has completed processing the subpacket 401, it completes the computation of the check sequence 407, and appends the check sequence 407 at the end of the subpacket 405. The remaining fragments of the subpacket 401 are passed through the transmission interface.

Figure 5:
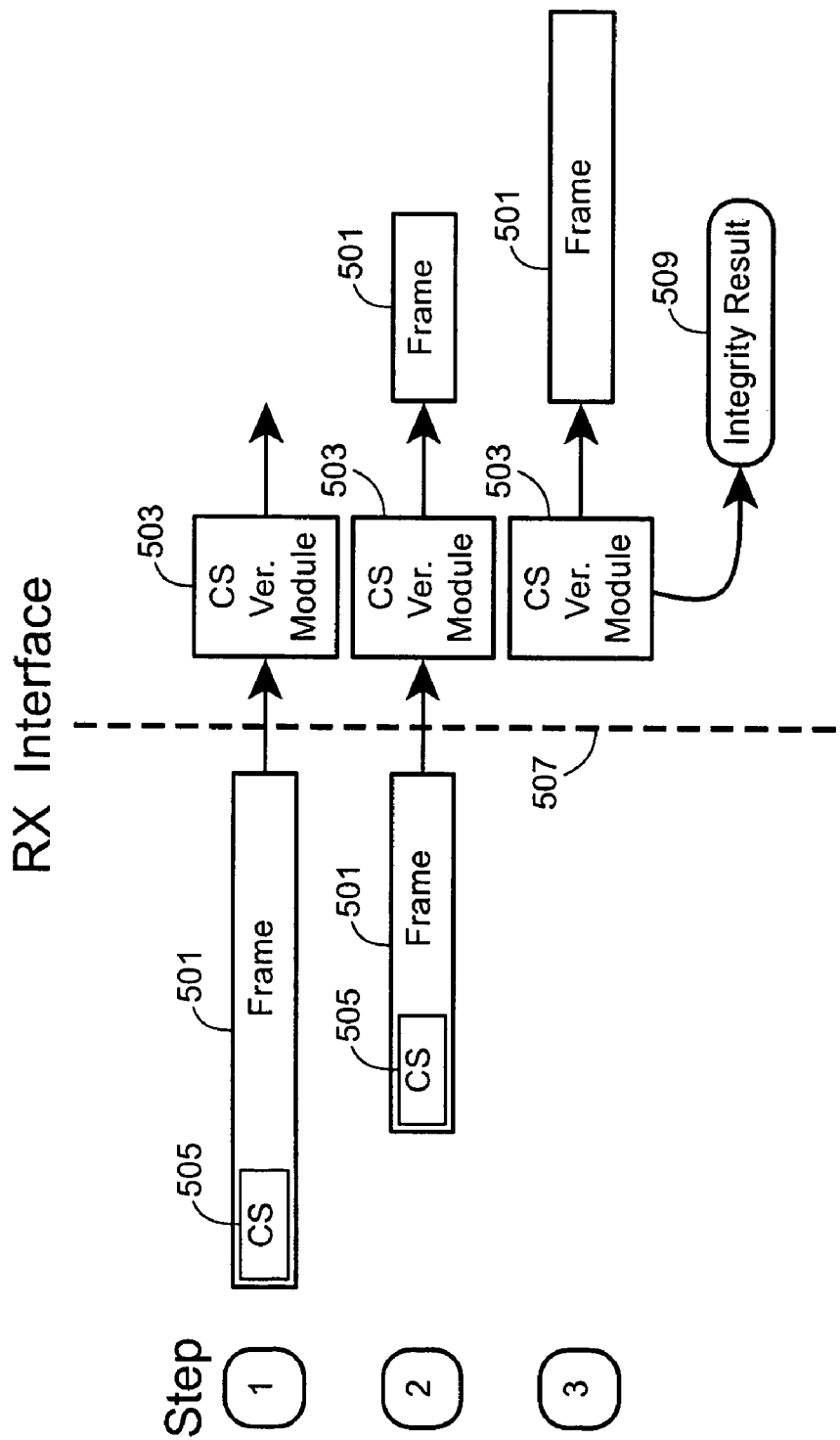
FIG. 5 shows a flow diagram of one embodiment of a method in a wireless receiver for sequentially verifying the integrity of a subpacket containing a check sequence located at the end of the subpacket.

FIG. 5 shows a flow diagram of a method in a wireless receiver for sequentially verifying the integrity of a subpacket containing a check sequence located at the end of the subpacket. Such a method can be used, for example, by a MAC processor to verify the integrity of the MAC frame by using the FCS located at the end of the MAC frame.

In FIG. 5, a receiver receives a subpacket 501 including a check sequence 505 from the receive interface 507. If the subpacket 501 contains no transmission errors, it will be identical to the subpacket transmitted generated in FIG. 4. Upon receiving the subpacket 501, a check sequence verification module 503 processes the subpacket 501 containing the check sequence 505. After processing the subpacket, the check sequence verification module produces an integrity result 509 that is conveyed to other parts of the processing system in the receiver.

It is important to note that no buffering or extra manipulation of the check sequence is required for methods described in FIG. 4 and FIG. 5. As the check sequence generator module 403 in the transmitter reads each fragment of the subpacket, processed fragments are ready to be transmitted. After the check sequence generator module 403 finishes reading the subpacket, the check sequence is immediately outputted. As, the check sequence verification module 503 in the receiver reads each fragment of the subpacket, processed fragments are ready to be passed on to other modules in the receiver. In other words, a subpacket with an appended check sequence can typically be sequentially generated in the transmitter, and the subpacket with an appended check sequence can typically be sequentially verified in the receiver.

A Method for Embedding the Check Sequence

One aspect of the invention is generating a check sequence for a subpacket of a packet, where the check sequence will be placed in an embedding field within the subpacket, and where the embedding field is located prior to the end of the subpacket.

Figure 6:
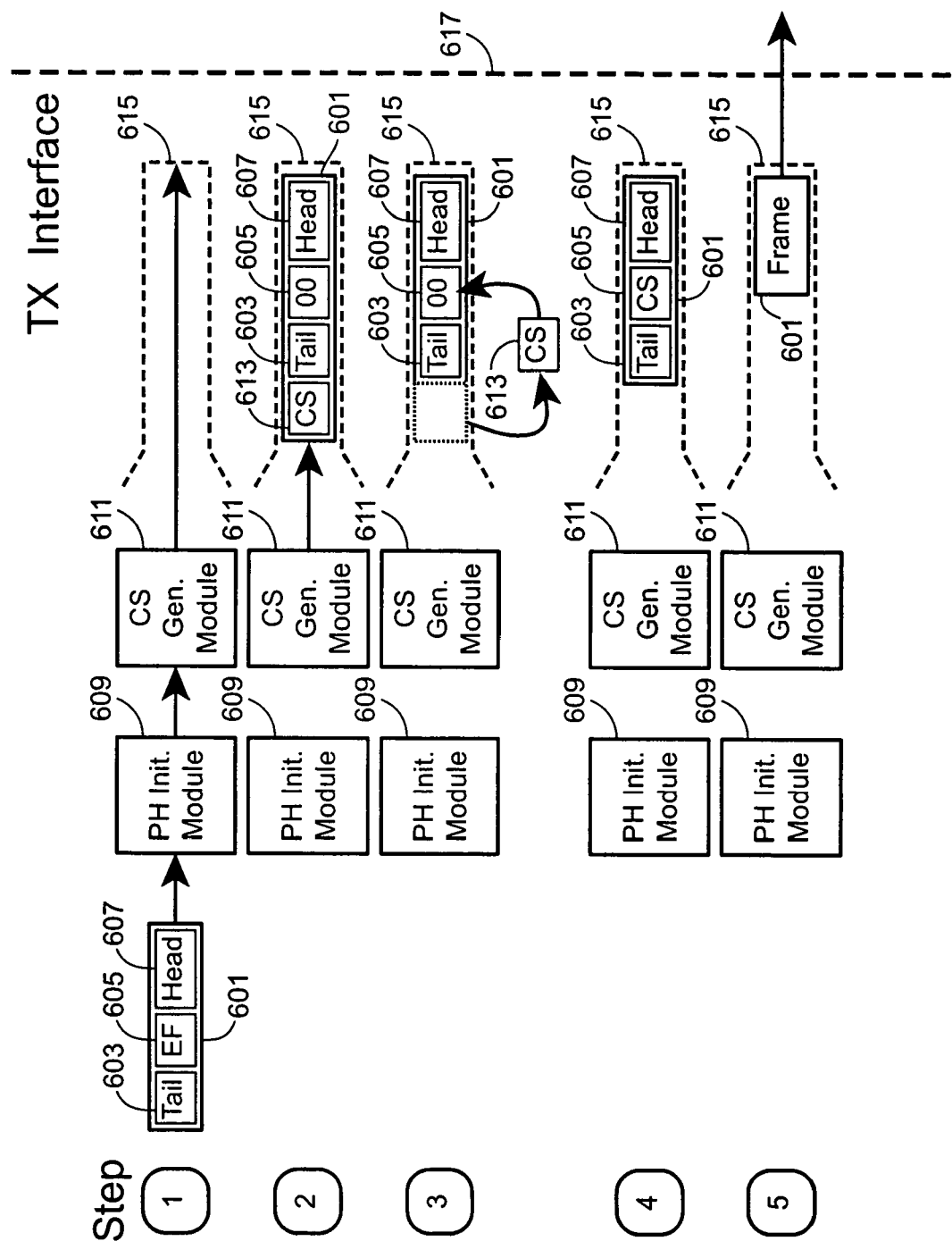
FIG. 6 shows a flow diagram of one embodiment of a method in a wireless transmitter for generating a check sequence for a subpacket of a packet where the check sequence is to be placed in an embedding field within the subpacket located prior to the end of the subpacket.

FIG. 6 shows a flow diagram of a method in a wireless transmitter for generating a check sequence for a subpacket of a packet where the check sequence is to be placed in an embedding field within the subpacket located prior to the end of the subpacket. Such a method can be used to protect, for example, the PCLP SIGNAL field and the MAC header using a check sequence stored in one or more reserved bits of the PLCP SERVICE field. See for example, U.S. patent application Ser. No. 10/629,383, incorporated herein by reference. Such a method also can be used for the MAC header or part thereof.

In FIG. 6, a subpacket to be transmitted 601 includes a first fragment of the message 607, an embedding field 605 and a last fragment of the message 603. The subpacket 601 is processed through an embedding field initialization module 609 that initializes the embedding field 605 with some initialization vector, usually zero. The resulting fragments are processed through a check sequence generator module 611 that appends a check sequence 613 to the end of the subpacket. The resulting fragments are then fed into a buffer module 615 that buffers the entire subpacket 601. After buffering the subpacket 601, the buffer module 615 copies the check sequence 613 into the embedding field 605 and removes the check sequence from the end of the subpacket. Finally, the entire subpacket 601 is passed through the transmission interface 617 for transmission.

Figure 7:
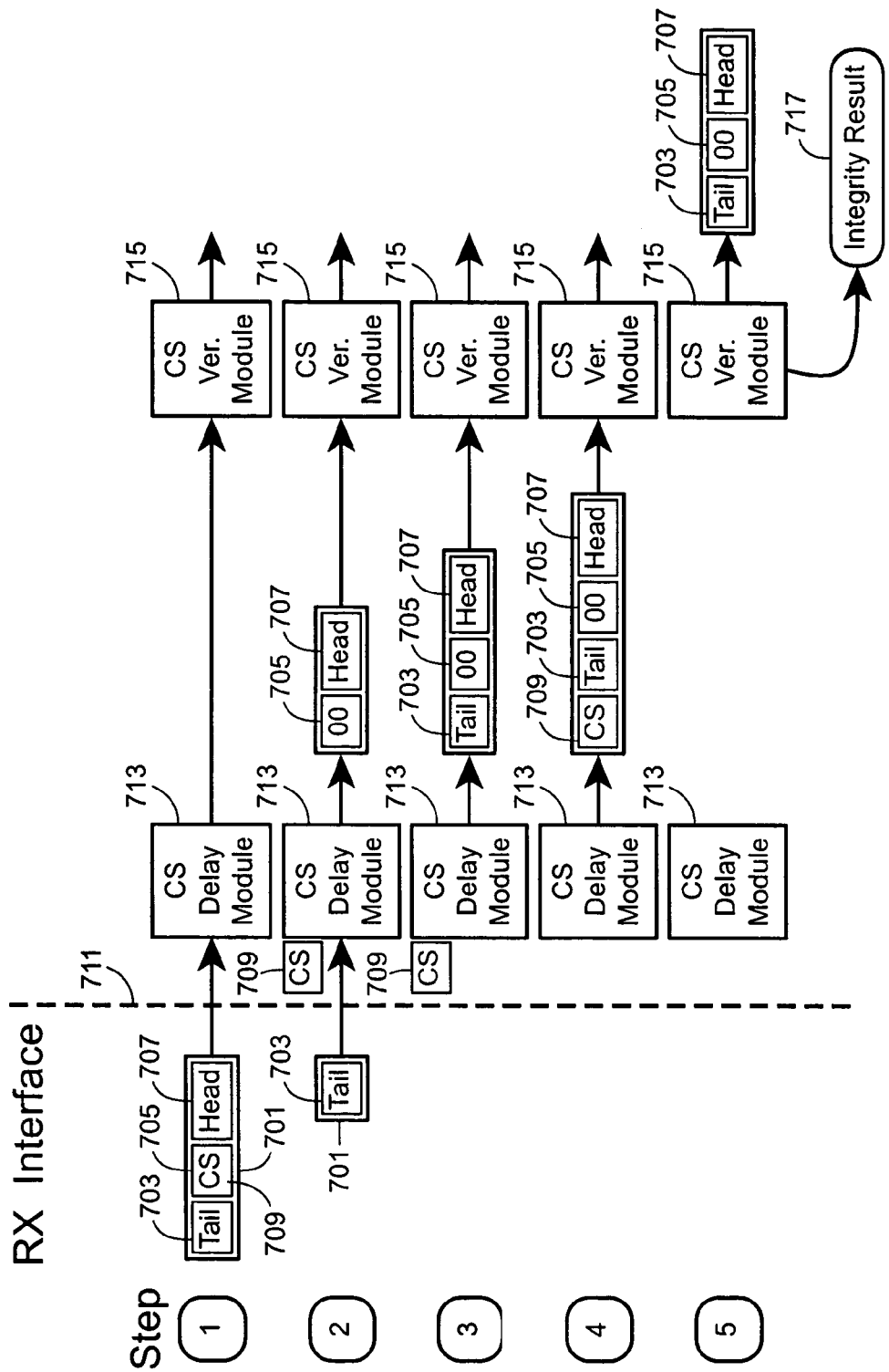
FIG. 7 shows a flow diagram of one embodiment of a method in a wireless receiver for verifying the integrity of a subpacket containing a check sequence located prior the end of the subpacket.

FIG. 7 shows a flow diagram of a method in a wireless receiver for verifying the integrity of a subpacket containing a check sequence located prior the end of the subpacket. Such a method can be used to verify the integrity, for example, of the PCLP SIGNAL field and the MAC header using a check sequence stored in one or more reserved bits of the PLCP SERVICE field.

In FIG. 7, a subpacket 701 is received from the receive interface 711 containing a first fragment of the message 707, an embedding field 705 which contains a check sequence 709, and a last fragment of the message 703. If the subpacket 701 contains no transmission errors, it will be identical to the subpacket generated from FIG. 6. A check sequence delay module 713 then begins processing the subpacket 701 by extracting and buffering the check sequence 709 and setting the embedding field 705 with an initialization vector. Once the subpacket 701 has passed through, the check sequence delay module 713 appends the check sequence 709 to the end of the subpacket so as to recreate the output of the check sequence generator module 611. Completed fragments from the check sequence delay module 713 are passed to a check sequence verification module 715. After processing the subpacket, the check sequence verification module produces an integrity result 717 that is conveyed to other parts of the processing system in the receiver.

Verification of a subpacket of a packet with a check sequence in a receiver, where the check sequence is placed in an embedding field withinit the subpacket, and where the embedding field is located prior to the end of the subpack can be simplified at the cost of using a slightly more computationally involved check sequence than the traditional one illustrated in FIG. 5. In other words, it is possible to generate a check sequence for the subpacket of a packet such that when a receiver receives a subset of the packet including the subpacket, the receiver can verify the subpacket using the method illustrated in FIG. 5 without explicitly processing the check sequence, e.g., without delay feeding the check sequence.

Embedding a Check Sequence Using Polynomial Codes

An import improvement to the method described above is a method for generating a check sequence for a subpacket such that the receiver can verify the subpacket without explicitly manipulating the check sequence. Embodiments of the invention implement this inventive aspect by using polynomial (CRC) codes. For many wireless network applications, including WLANs that conform to the IEEE 802.11a, 802.11b and 802.11g variants, polynomial (CRC) codes are typically used to protect subpackets. For many wireless networking applications, polynomial codes are often preferable compared to other ECC and EDC schemes for their simplicity, low transmission costs and high error-detecting capability. For example, polynomial (CRC) coding methods can detect all single and double bit errors, all errors with an odd number of bits, and burst errors as described in the following table:

| Polynomial Code (CRC) Burst Error Detection Rate | Burst Error Length vs. Checksum Length (n) |
| --- | --- |
| Detects all burst errors | <n bits |
| Detects $(1-2^{-(n-1)}) \cdot 100\%$ of burst errors | =n bits |
| Detects $(1-2^{-n}) \cdot 100\%$ of burst errors | >n bits |

A general method for generating a polynomial code checksum (check sequence) to be located before the end of the subpacket to be protected is described herein.

Consider polynomials whose coefficients belong to GF(2), namely the Galois field over the set $\{0,1\}$ with addition defined as logical-XOR and multiplication defined as logical-AND. These polynomials together with regular polynomial addition and regular polynomial multiplication form a field. If the addition and multiplication are modulo a irreducible (prime) polynomial of degree n over GF(2), then the field is finite and isomorphic to $GF(2^n)$.

An aspect of the invention is protecting a subpacket Denote by $A=(a_m, \ldots, a_0)$ the bit string of the subpacket to be protected where m+1 denotes the length of A in bits, and each $a_i$, i=0, ..., m, is one of the bits. Bit strings are represented in the polynomial field as polynomials whose coefficients represent elements from the bit string. Denote by G(x) a generator polynomial and denote by $G=(g_n, \ldots, g_0)$ the bit string corresponding to G(x), where n+1 denotes the length of G in bits, and each $g_i$, i=0, ..., n is one of the bits of G. Denote as A(x) the polynomial of A. In other words, $A(x)=a_m x^m + \ldots + a_0$ and $G(x)=g_m x^m + \ldots + g_0$.

For any degree n>1, there exists at least one primitive polynomial. As is known in the art, G(x) is typically chosen such that it is a primitive polynomial with maximal error-detecting characteristics.

Let checksum C represent an n-bit long bit string which is a function of the subpacket to be protected, i.e., a function of A. The polynomial checksum of A(x), denoted C(A(x)), is usually defined as $C(A(x))=(x^n A(x)+I(x)) \bmod G(x)$, where I(x) is the polynomial of I, an n-bit long initialization value that is typically, but not necessarily, set to zero. Thus, usually, $C(A(x))=x^n A(x) \bmod G(x)$. The checksum is analogous to a check sequence described in the above description of a method using an appended check sequence.

Checksums can be calculated sequentially, bit by bit, over the subpacket by applying some variation of Horner's Rule that states that a polynomial in some variable x, e.g., the polynomial $A(x)=a_0+a_1 x+a_2 x^2+a_3 x^3+\ldots$ may be written as $A(x)=a_0+x(a_1+x(a_2+x(a_3+\ldots)))$. Thus the checksum C(A(x)) may be evaluated sequentially, bit by bit, with repeated bit-wise operations, rather than naively storing and dividing a large bit string.

Denote by M the (n+1+m)-bit long bit string of combination of the subpacket. A and the checksum C to be transmitted. In wireless applications, for example, M may be the subpacket appended with the checksum, e.g., $M(x)=x^n A(x)+C(A(x))$, where M(x) is the polynomial corresponding to M.

Denote by M' the bit string of the combination of the subpacket and the checksum received by the receiver. M' may or may not be identical to M. To verify the integrity of the received subpacket, the receiver may calculate the residue M'(x) mod G(x), where M'(x) is the polynomial corresponding to M'. If the combination of the subpacket and checksum was transmitted error-free, that is M'=M, then the residue M'(x) mod G(x) would be the polynomial I(x), where I(x) corresponds to initialization value I, usually set to zero.

One aspect of the invention is placing a checksum of some length, e.g., a length of n, not at the end of the subpacket to be protected, but rather earlier, say a number denoted l bits before the end. Let $A_1$ denote an n-bit long embedding field to which the initialization vector, I, initialize, positioned l bits before the end of the subpacket, and let $A_0$ and $A_2$ denote the head (beginning) and tail (end) of the subpacket to be protected, respectively, with the tail $A_2$ being l-bits long. Recall $A=(a_m, \ldots, a_0)$. Then $$A = (\underbrace{a_m, \ldots, a_{l+n}}_{A_0}, \underbrace{a_{l+n-l}, \ldots, a_l}_{A_1}, \underbrace{a_{l-1}, \ldots, a_0}_{A_2}), \text{ and}$$

$$A(x)=x^{l+n}A_0(x)+x^l A_1(x)+A_2(x).$$

If the embedding field $A_1$ is initialized with the n-bit long initialization value I, which is typically set to zero, then:

$$A(x)=x^{l+n}A_0(x)+A_2(x).$$

Instead of transmitting, e.g., wirelessly transmitting the subpacket appended with the checksum, in one embodiment, one transmits the subpacket with an embedded checksum placed in the embedding field. Denote by E an n-bit long bit string, the checksum to be placed in the embedding field, where E(x) is the polynomial corresponding to E. Then the polynomial of the message to be transmitted is $M(x)=x^{l+n}A_0(x)+x^l E(x)+A_2(x)$.

Another aspect of the invention is generating E (corresponding to the polynomial E(x)) such that the wireless receiver can verify the integrity of subpacket by the above-described method as if a checksum was at the end, e.g., using $(x^{l+n}A_0(x)+x^l E(x)+A_2(x)) \bmod G(x)=0$.

A relationship between the embedded checksum E can be readily derived in terms of the checksum C, where C is the checksum that would be appended if the above-described method of appending was used. Recall that the checksum C is calculated as a function of A, i.e., $C(A(x))=x^n A(x) \mod G(x)$. The relationship between E and C is $$E(x)=x^{-(l+n)}C(A(x)).$$

Solutions to the above equation for E(x) can be readily calculated. In particular, if l, n and G are constant, then a constant n×n repositioning matrix, denoted R, can be computed such that $E=C \times R$. Denote the i,j'th element of R as $r_{ij}$, denote the n bits of C as $(c_{n-1}, \ldots, c_0)$ and denote the n bits of E as $(e_{n-1}, \ldots, e_0)$.

It can be shown that $r_{ij}$ is the n−1−j'th coefficient of $x^{-(l+n)+(n-1-i)} \mod G(x)$, and that $$e_j = \sum_{i=0}^{n-1} r_{ij} c_j.$$

Illustrating the Improved Embedded Check Sequence Method

Figure 8:
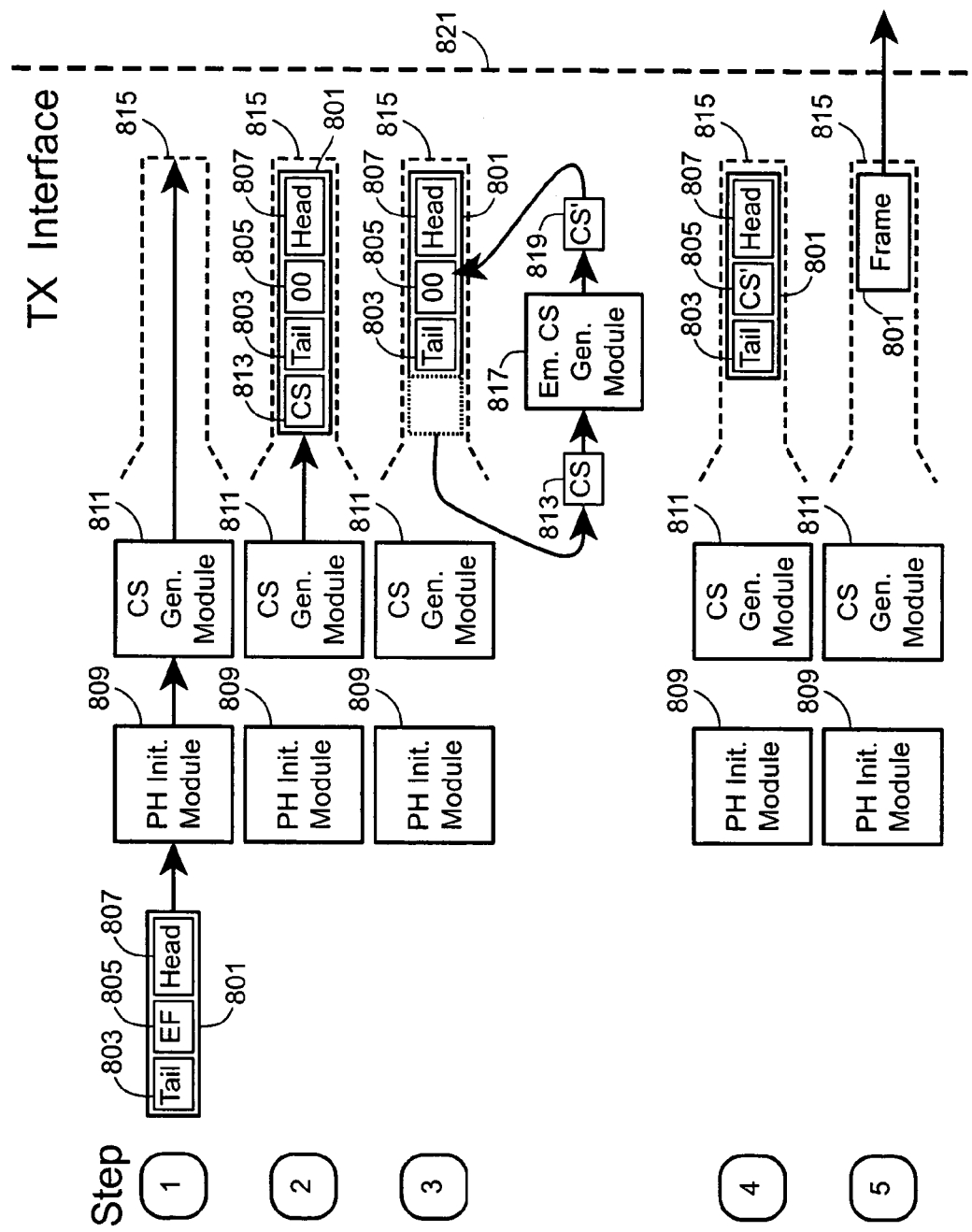
FIG. 8 shows a flow diagram of an embodiment of a method in a wireless transmitter for generating a check sequence for a subpacket of a packet where the check sequence is to be placed in an embedding field within the subpacket located prior to the end of the subpacket.

FIG. 8 shows a flow diagram of an embodiment of a method in a wireless transmitter for generating a check sequence for a subpacket of a packet where the check sequence is to be placed in an embedding field within the subpacket located prior to the end of the subpacket. Such a method can be used to protect, for example, the PCLP SIGNAL field, or other parts of the PCLP header, and/or the MAC header using a check sequence stored in one or more reserved bits of the PLCP SERVICE field.

In FIG. 8, a subpacket to be transmitted 801 contains a first fragment of the message 807, an embedding field 805 and a last fragment of the message 803. The subpacket 801 is processed through an embedding field initialization module 809 that initializes the embedding field 805 to some initialization vector, in one embodiment, zero. The resulting fragments are processed through a check sequence generator module 811 that generates a check sequence 813, for example by appending the check sequence to the end of the subpacket. The resulting fragments are then fed into a buffer module 815 that buffers the entire subpacket 801. After buffering the subpacket 801, the buffer module 815 passes the check sequence 813 to a check sequence generator module 817 which embeds the check sequence 819 into the embedding field 805 and removes the check sequence from the end of the subpacket. Finally, the entire subpacket 801 is passed through the transmission interface 821 for transmission. A receiver receiving the protected subpacket generated by an embodiment of the method described in FIG. 8 can serially verify the subpacket without explicitly processing the check sequence.

Improved Embedded Check Sequence Method Example

Suppose it is desired to transmit a 100-byte long subpacket (800 bits) with an embedding field located 10 bytes (80 bits) before the end of the subpacket (l=80) using the CRC-8 checksum standard (n=8).

$$A = (\underbrace{a_{799}, \ldots, a_{88}}_{A_0}, \underbrace{a_{87}, \ldots, a_{80}}_{A_1}, \underbrace{a_{79}, \ldots, a_0}_{A_2}).$$

The CRC-8 standard provides degree n=8 and a generator polynomial of:

$$G(x)=x^8+x^2+x+1$$

Such a generator polynomial detects all single-bit and double-bit errors, and all errors resulting in odd parity, and all burst errors less than or equal to 8-bits in length.

The repositioning matrix R can be pre-computed, e.g., hard-coded in hardware or provided as software, before any transmitting takes place as follows:

$$x^{-88+7} \mod G(x) = +x^7 + x^6 \qquad\qquad +x^3$$
$$x^{-88+6} \mod G(x) = \qquad +x^6 + x^5 \qquad +x^2$$
$$x^{-88+5} \mod G(x) = \qquad\qquad +x^5 + x^4 \quad +x^1$$
$$x^{-88+4} \mod G(x) = \qquad\qquad\qquad +x^4 + x^3 \;+x^0$$
$$x^{-88+3} \mod G(x) = +x^7 \qquad\qquad +x^3 + x^2 + x^1 + x^0$$
$$x^{-88+2} \mod G(x) = +x^7 + x^6 \qquad\qquad +x^2$$
$$x^{-88+1} \mod G(x) = \qquad +x^6 + x^5 \qquad\qquad +x^1$$
$$x^{-88+0} \mod G(x) = \qquad\qquad +x^5 + x^4 \qquad +x^0$$

In other words, the repositioning matrix R in binary form, or any equivalent representation of the information therein, can be pre-computed as:

$$R = \begin{pmatrix} 1 & 1 & 0 & 0 & 1 & 0 & 0 & 0 \\ 0 & 1 & 1 & 0 & 0 & 1 & 0 & 0 \\ 0 & 0 & 1 & 1 & 0 & 0 & 1 & 0 \\ 0 & 0 & 0 & 1 & 1 & 0 & 0 & 1 \\ 1 & 0 & 0 & 0 & 1 & 1 & 1 & 1 \\ 1 & 1 & 0 & 0 & 0 & 1 & 0 & 0 \\ 0 & 1 & 1 & 0 & 0 & 0 & 1 & 0 \\ 0 & 0 & 1 & 1 & 0 & 0 & 0 & 1 \end{pmatrix}$$

In the transmitter, when the transmitter knows the subpacket to protect, in one embodiment, the embedding field is initialized to zero. That is, using the notation described herein, $$M=(a_{799}, \ldots, a_{88}, 0,0,0,0,0,0,0,0, a_{79}, \ldots, a_0)$$

Next, in one embodiment, the transmitter calculates a polynomial code checksum C using the CRC-8 standard. For the purposes of this example, suppose C, in binary form, is:

$$C=(1\;0\;1\;0\;0\;0\;1\;1)$$

The transmitter next determines a set of bits by an operation of multiplying the checksum C with the repositioning matrix R, or any equivalent operation. In this example:

$$(1\;0\;1\;0\;0\;0\;1\;1) \times \begin{pmatrix} 1 & 1 & 0 & 0 & 1 & 0 & 0 & 0 \\ 0 & 1 & 1 & 0 & 0 & 1 & 0 & 0 \\ 0 & 0 & 1 & 1 & 0 & 0 & 1 & 0 \\ 0 & 0 & 0 & 1 & 1 & 0 & 0 & 1 \\ 1 & 0 & 0 & 0 & 1 & 1 & 1 & 1 \\ 1 & 1 & 0 & 0 & 0 & 1 & 0 & 0 \\ 0 & 1 & 1 & 0 & 0 & 0 & 1 & 0 \\ 0 & 0 & 1 & 1 & 0 & 0 & 0 & 1 \end{pmatrix} =$$

$$(1\;0\;1\;0\;1\;0\;0\;1)$$

The result is the checksum which is then copied into the embedding field of the message to be transmitted. In this example, the message M to be transmitted is:

M=($a_{799}$, ... ,$a_{88}$, 1,0,1,0,1,0,0,1,$a_{79}$, ... ,$a_0$).

A receiver receiving this subpacket M can verify it using a conventional CRC-8 module without modifications, as if a checksum was appended at the end.

Method in a Transmitting Wireless Station

In one embodiment of the invention, a check sequence for a subpacket of a packet is generated by a first wireless station such that a second wireless station wirelessly receiving a signal corresponding to the packet can sequentially verify the integrity of the subpacket without processing the check sequence more than once.

In one embodiment, a method generates a check sequence to protect the integrity of a subpacket of a packet, wherein the packet is to be wirelessly transmitted. In another embodiment, the method further embeds the check sequence in an embedding field within the packet, where the embedding field is located prior to the end of the subpacket. In another embodiment, the method further includes wirelessly transmitting the packet. In another embodiment, the check sequence is generated such that a second wireless station wirelessly receiving a signal corresponding to the packet can sequentially verify the integrity of the subpacket as if the check sequence were appended at the end of the subpacket being protected as if the check sequence were appended at the end of the subpacket being protected.

In one embodiment, the generating comprises computing an appended check sequence of the subpacket. In another embodiment, the generating further comprises multiplying the appended check sequence by a re-positioning matrix to determine the check sequence. In another embodiment, the method further comprises setting at least one bit of the packet such that the second wireless station can ascertain whether there the check sequence is in the packet. In another embodiment, the generating includes a calculation substantially conforming to a polynomial code checksum calculation. In another embodiment, the polynomial code checksum calculation uses a generator polynomial of $x^8+x^2+x+1$.

In one embodiment, the packet substantially conforms to one of the OFDM variants of the IEEE 802.11 standard or a derivative thereof. In another embodiment, the packet includes a SERVICE field, a PLCP header and a MAC header. In another embodiment, the embedding field includes at least one bit of the SERVICE field. In another embodiment, the subpacket includes at least one bit of a PLCP header and at least one bit of the MAC header.

Apparatus in a Transmitting Wireless Station

The various embodiments of the method described above are substantially incorporated into one or components of an apparatus of a wireless station.

Figure 9:
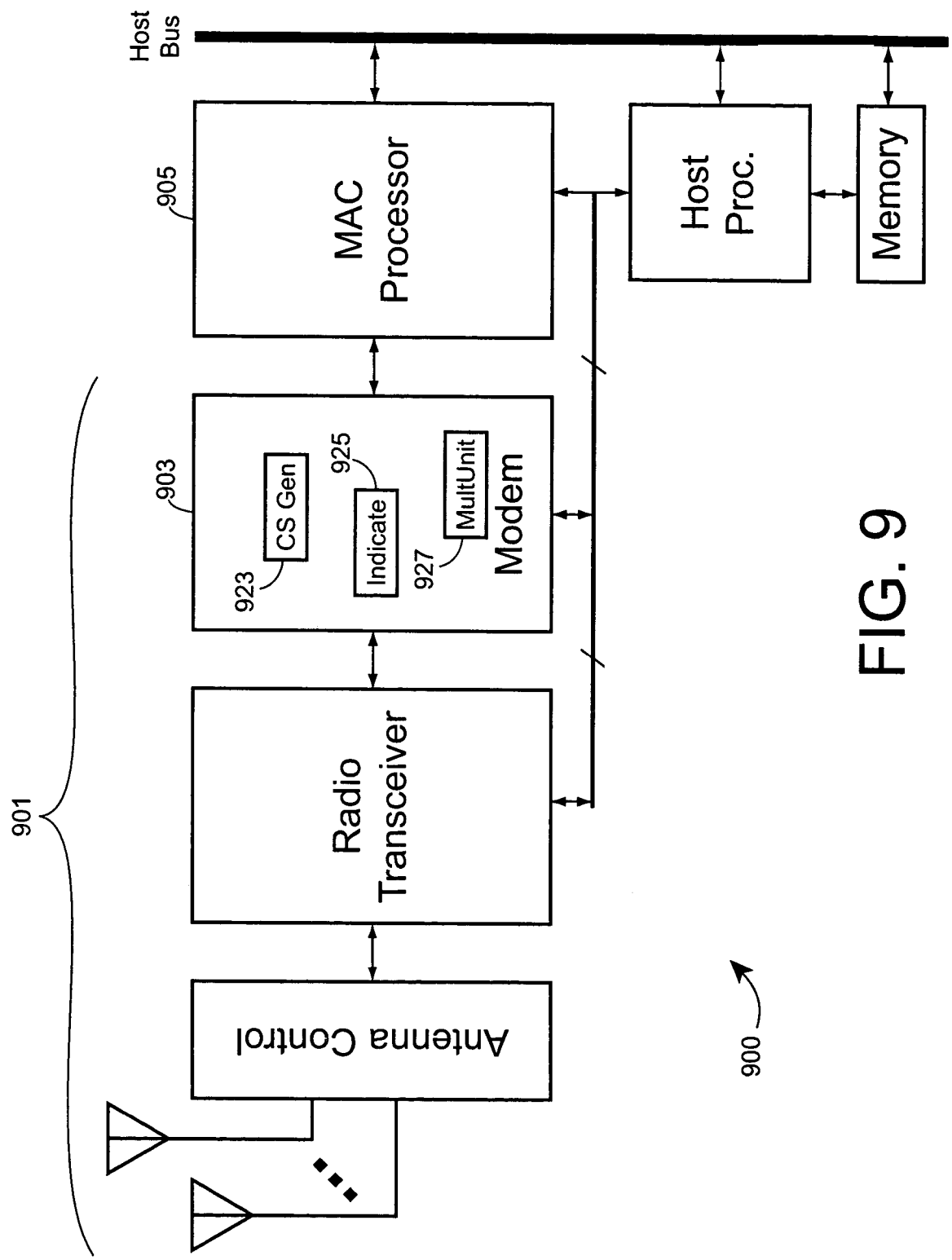
FIG. 9 shows a simplified block diagram of an embodiment of the present invention including a check sequence generator, an indicator unit and a multiplier unit.

FIG. 9 shows a simplified block diagram of an embodiment of the present invention including a check sequence generator, an indicator unit and a multiplier unit. The embodiment is similar to the apparatus shown in FIG. 1 with additional aspects of the present invention. In FIG. 9, the apparatus 900 includes a physical (PHY) layer interface processor (processing unit) 901 coupled to a MAC processor 905.

In one embodiment, a check sequence generator 923 is located in the physical (PHY) processor 901, and is incorporated into the modem 903 as shown in FIG. 9. In another embodiment, the check sequence detector 923 is located in the MAC processor 905. In another embodiment, the check sequence detector 923 is connected to the MAC processor and/or the physical (PHY) processor 901 via a data bus and/or data path. The check sequence generator 923 is arranged to generate a check sequence to protect the integrity of the subpacket and to embed the check sequence in an embedding field within the packet as described in the method subsection above. In one embodiment, the check sequence generator 923 is coupled directly to the MAC processor 905. In another embodiment, the check sequence generator 923 is coupled to the MAC processor 905 through the modem 903.

In one embodiment, an indicator unit 925 is located in the physical (PHY) processor 901, and is incorporated into the modem 903 as shown in FIG. 9. In another embodiment, the indicator unit 925 is located in the MAC processor 905. In another embodiment, the indicator unit 925 is connected to the MAC processor and/or the physical (PHY) processor 901 via a data bus and/or data path. The indicator unit 925 is arranged to set at least one bit of a packet such that wireless station can ascertain whether there is a check sequence in the packet as described in the method subsection above. In one embodiment, the indicator unit 925 is coupled directly to the MAC processor 905. In another embodiment, the indicator unit 925 is coupled to the MAC processor 905 through the modem 903. In another embodiment, the indicator unit 925 is coupled to the check sequence generator 923.

In one embodiment, a multiplier unit 927 is located in the physical (PHY) processor 901, and is incorporated into the modem 903 as shown in FIG. 9. In another embodiment, multiplier unit 927 is located in the MAC processor 905. In another embodiment, the multiplier unit 927 is connected to the MAC processor and/or the physical (PHY) processor 901 via a data bus and/or data path. The multiplier unit 927 is arranged to set at least one bit of a packet such that wireless station can ascertain whether there is a check sequence in the packet as described in the method subsection above. In one embodiment, the multiplier unit 927 is coupled directly to the MAC processor 905. In another embodiment, the multiplier unit 927 is coupled to the MAC processor 905 through the modem 903. In another embodiment, multiplier unit 927 is coupled to the check sequence generator 923. In another embodiment, the multiplier unit 927 is coupled to the indicator unit 925.

Method in a Receiving Wireless Station

In one embodiment of the invention, a subpacket's integrity of verified using a check sequence. A packet containing the check sequence and the subpacket is transmitted and generated by a method in a second wireless station. The method generates the check sequence in such a way that the first wireless station can sequentially verify the integrity of the subpacket without processing the check sequence more than once.

In one embodiment, a first method comprises wirelessly receiving a signal corresponding to a packet wirelessly transmitted by a second wireless station. In another embodiment, the packet includes a subpacket and a check sequence. In another embodiment, the check sequence is in an embedding field within the packet. In another embodiment, the embedding field is located prior to the end of the subpacket. In one embodiment, the first method further comprises verifying the integrity of the subpacket, the verifying at least using the check sequences. In another embodiment the check sequence was generated by a second method in the second wireless station. In another embodiment, the second method comprises generating a check sequence to protect the integrity of a subpacket. In another embodiment, the second method further comprises embedding the check sequence in the embedding field. In another embodiment, the second method further comprises wirelessly transmitting the packet. In another embodiment, the check sequence is generated such that the first wireless station can sequentially verify the integrity of the subpacket as if the check sequence were appended at the end of the subpacket being protected as if the check sequence were appended at the end of the subpacket being protected.

In one embodiment, the generating in the second method further comprises computing an appended check sequence of the subpacket. In another embodiment, the second method further comprises multiplying the appended check sequence by a re-positioning matrix to determine the check sequence.

In one embodiment, the first method further comprises ascertaining whether the check sequence is in the packet, the ascertaining at least using at least one bit of the packet. In another embodiment, the first method further comprises verifying in the first method includes a calculation substantially conforming to a polynomial code checksum calculation. In another embodiment, the polynomial code checksum calculation uses a generator polynomial of $x^8+x^2+x+1$.

In one embodiment, the packet substantially conforms to one of the OFDM variants of the IEEE 802.11 standard or a derivative thereof. In another embodiment, the packet includes a SERVICE field, a PLCP header and a MAC header. In another embodiment, the embedding field includes at least one bit of the SERVICE field. In another embodiment, the subpacket includes at least one bit of a PLCP header and at least one bit of the MAC header.

Apparatus in a Receiving Wireless Station

The various embodiments of the method described above are substantially incorporated into one or components of an apparatus of a wireless station.

Figure 10:
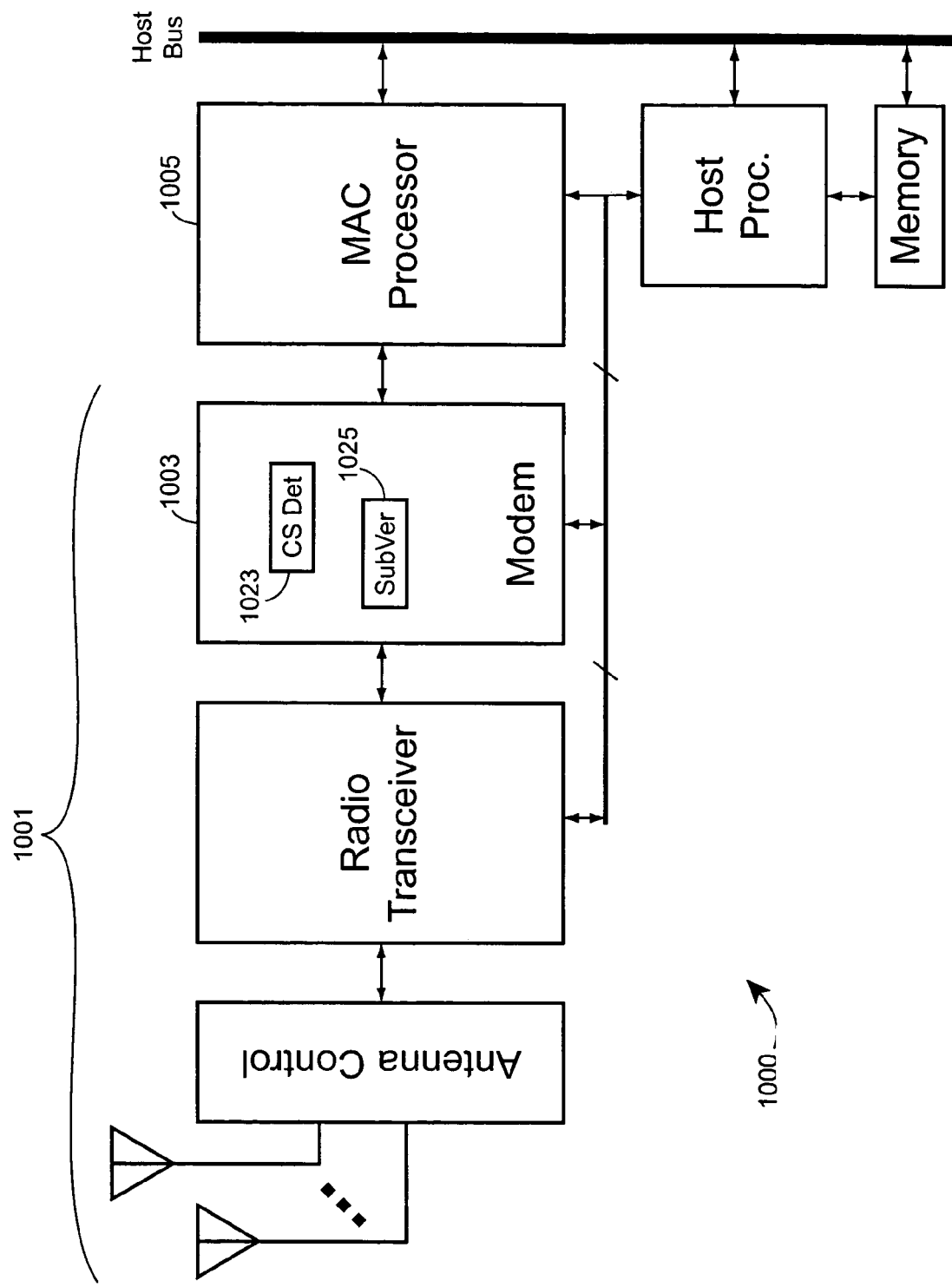
FIG. 10 shows a simplified block diagram of an embodiment of the present invention including a check sequence detector and a subpacket verifier.

FIG. 10 shows a simplified block diagram of an embodiment of the present invention including a check sequence detector and a subpacket verifier. The embodiment is similar to the apparatus shown in FIG. 1 with additional aspects of the present invention. In FIG. 10, the apparatus 1 includes a physical (PHY) layer interface processor (processing unit) 1001 coupled to a MAC processor 1005.

In one embodiment, a check sequence detector 1023 is located in the physical (PHY) processor 1001, and is incorporated into the modem 1003 as shown in FIG. 10. In another embodiment, the check sequence detector 1023 is located in the MAC processor 1005. In another embodiment, the check sequence detector 1023 is connected to the MAC processor and/or the physical (PHY) processor 1001 via a data bus and/or data path. The check sequence detector 1023 is arranged to ascertain whether there is a check sequence in a wirelessly received packet as described in the method subsection above. In one embodiment, the check sequence detector 1023 is coupled directly to the MAC processor 1005. In another embodiment, the check sequence detector 1023 is coupled to the MAC processor 1005 through the modem 1003.

In one embodiment, a subpacket verifier 1025 is located in the physical (PHY) processor 1001, and is incorporated into the modem 1003 as shown in FIG. 10. In another embodiment, the subpacket verifier 1025 is located in the MAC processor 1005. In another embodiment, the subpacket verifier 1025 is connected to the MAC processor and/or the physical (PHY) processor 1001 via a data bus and/or data path. The subpacket verifier 1025 is arranged to verify the integrity of a subpacket as described in the method subsection above. In one embodiment, the subpacket verifier 1025 is coupled directly to the MAC processor 1005. In another embodiment, the subpacket verifier 1025 is coupled to the MAC processor 1005 through the modem 1003. In another embodiment, the subpacket verifier 1025 is coupled to the check sequence detector 1023.

Additional Hardware and Software Implementation

Some embodiments of the invention can be implemented in hardware, e.g., as an apparatus in a wireless station. It is well known in the art that polynomial (CRC) code modules can readily be implemented using a combination of one or more Linear Feedback Shift Registers (LFSRs) and logic gates. Similarly, it is well known in the art that constant bit-wise matrix multiplication can be readily be implemented using a combination of XOR gates in the form a XOR tree. Similarly, it is well known in the art that apparatuses requiring high speed polynomial (CRC) coding calculations can readily implement them in parallel.

Some embodiments of the invention can be implemented in software, e.g., a carrier medium including one or more computer readable code segments to instruct one or more processors of a processing system to implement a method. A number of software implementations of various polynomial (CRC) code methods are well known in the art and can be readily be used to implement aspects of the invention. Similarly, bit-wise matrix multiplication is well known in the art and can readily be used to implement aspects of the invention.

Wireless Station Coexistence

One aspect of the invention is setting one or more bits of an unused portion of a packet substantially conforming a wireless networking standard. In one embodiment, such a wireless networking standard is one of the OFDM variants of the IEEE 802.11 standard or a derivative thereof.

One embodiment of the invention utilizes unused bits of the SERVICE field of the packet to transmit additional data such as a check sequence. As such, wireless stations making use of one or more embodiments of the present invention may co-exist on the same wireless network with other wireless stations that do not use any embodiments of the present invention.

Other Embodiments

Figure 11:
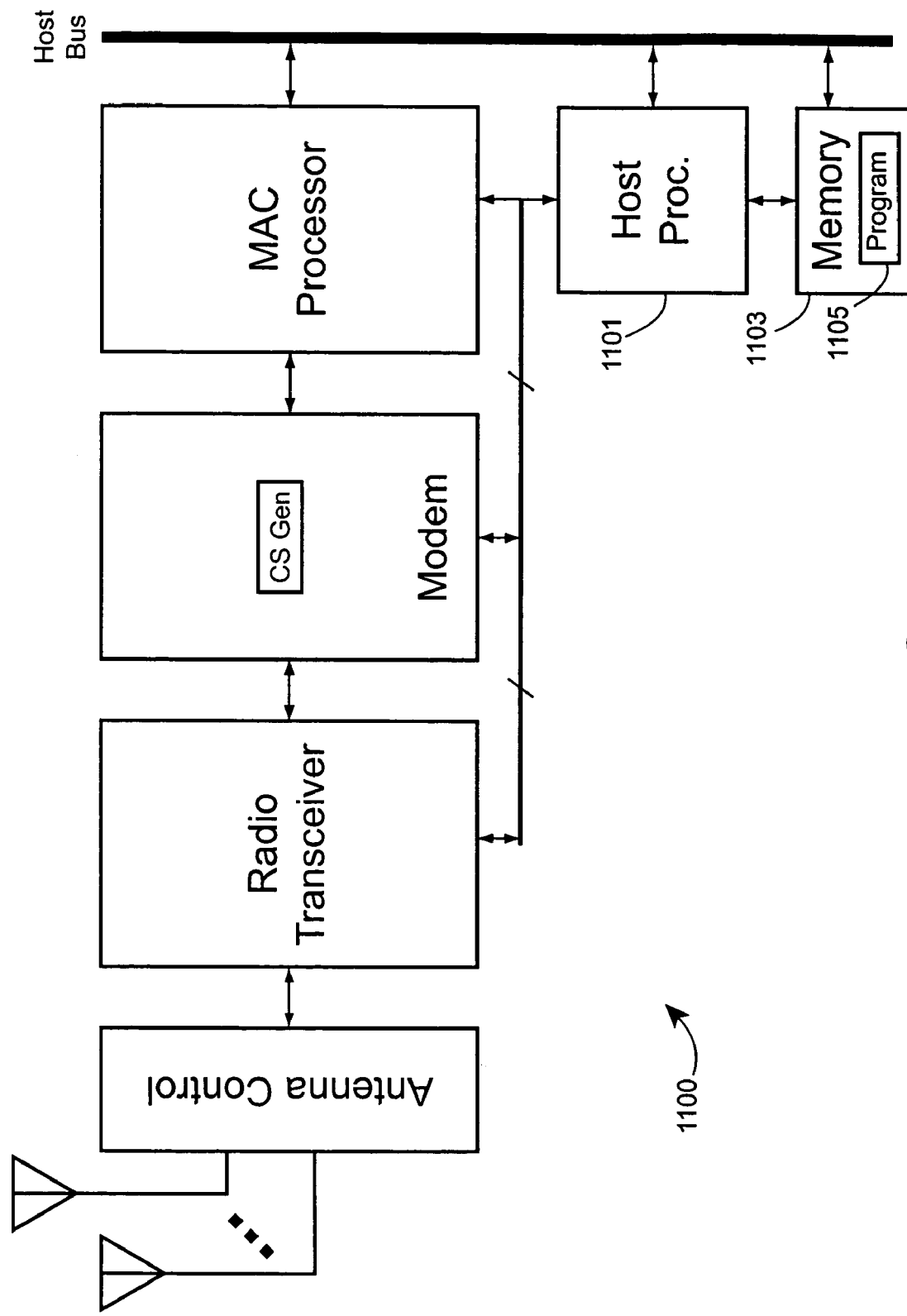
FIG. 11 shows a simplified block diagram of an embodiment of the present invention including a check sequence generator, wherein one or more elements are in the form of computer readable code in the memory of the host processor.

FIG. 11 shows a simplified block diagram of an embodiment of the present invention including a check sequence generator, wherein one or more elements are in the form of computer readable code in the memory of the host processor. In particular, the apparatus 1100 contains a host processor 1101 coupled to a memory 1103. The memory 1103 contains a carrier medium 1105 that includes one or more computer readable code segments to instruct the host processor 1101 to implement a method. Such a method can be any method embodiments of the present invention.

Another aspect of the invention involves the location of the embedding field. Embodiments described above have the embedding field located prior to the end of the subpacket to be protected. In other embodiments of the invention, the embedding field does not necessarily need to be a subset of the subpacket to be protected. For example, in one other embodiment, the embedding field is a subset of the packet but not entirely included in the subpacket to be protected. In such one other embodiment, the receiver and/or transmitter rearranges the bits so that the above description applies.

One aspect of the invention makes use of one or more bits of a packet to indicate to a receiver receiving the packet that a frame in the packet contains a check sequence. In one embodiment of the invention, a transmitter sets one or more bits of a packet to a value, e.g., setting one or more bits of the indication field to 1 when they are normally 0, etc. In another embodiment of the invention, a receiver determines whether or not the packet includes a check sequence by checking the indication field, e.g., checking if one or more bits of the indication field are set to 1 when they are normally 0. In another embodiment of the invention, the check sequence includes the indication field. In another embodiment of the invention, an apparatus contains an indication unit to indicate that the frame contains a check sequence. In another embodiment of the invention, an apparatus contains an indication unit to determine whether or not a frame includes a check sequence.

In one embodiment of the invention, a calculation substantially conforming to a polynomial (CRC) code checksum calculation occurs when generating a check sequence. In another embodiment of the invention, a calculation substantially conforming to a polynomial (CRC) code checksum calculation occurs when verifying a frame containing a check sequence. In yet another embodiment of the invention, such calculations occur in both the generating of a check sequence and the verifying a frame containing a check sequence.

Variations

It is well known in the art that the arrangement of bits in a sequence depends on the context of the application. For example, a particular bit-order depends on the protocols/standards that are employed and underlying/dependent hardware and/or software that is used, e.g., most-significant bit (MSB) order vs. least-significant bit (LSB) order. Furthermore, different encoding schemes may interleave or scramble bits from one context to another. In other words, bits in a "logical" context may not necessarily be ordered in the same way that it bits in a "real" context are ordered. It is also well known in the art that data processors units may not necessarily process packets sequentially in their respective bit-order. Thus, no attempt has been made to explicitly enumerate all the possible bit-orderings for transmitting, receiving, processing and/or generating bits of data. Therefore, all possible bit-ordering and bit-encoding schemes, and their derivatives and variants, are hereby incorporated as alternate embodiments of the invention.

Those in the art will be aware that the logical "end" of an arbitrary part of a packet, e.g., a subpacket, is dependent on context. In particular, a check sequence being "appended" to the end of a subpacket of a packet, can have at least three different interpretations depending on context. In one case, a subpacket contains a pre-defined field at the end of the subpacket that is used to store the check sequence. An example of this is the IEEE 802.11 MAC frame that contains a 4-byte frame check sequence (FCS) field. In another case, the end of the subpacket does not contain a pre-defined field at the end, and as such, the processing unit processing the subpacket adds a check sequence to the end of the subpacket, thereby extending the subpacket's length. An example of this includes many standard CRC modules (both in software and hardware). Therefore, all such variations to the "end" of a region or "before the end" of a region are hereby incorporated as alternate embodiments of the invention.

The check sequence is generated such that a second wireless station wirelessly receiving a signal corresponding to the packet can sequentially verify the integrity of the subpacket as if the check sequence were appended at the end of the subpacket being protected, such as would occur with a typical polynomial, e.g., CRC verifier that assumes there is a check sequence appended at the end. Thus, a prior art polynomial, e.g., CRC verifier can verify such a check sequence. By this is included the case that the second wireless station can serially verify the integrity of the subpacket without needing to process the check sequence more than once, i.e. more than when first encountered. By this is also included the case that the second wireless station can verify the integrity of the subpacket without needing to storing, e.g., to buffer the embedded check sequence. All these cases are meant to be included in the phrase "sequentially verify the integrity of the subpacket as if the check sequence were appended at the end of the subpacket being protected."

While the main embodiments described above have an embedding field that is contiguous and that is within a subpacket being protected by the embedding field, embodiments of the invention are able to protect arbitrary, not-necessarily contiguous regions of a packet. Furthermore, fields where check sequences are located, e.g., embedding fields, need not necessarily be contiguous regions. Thus, it is to be clearly expressed that subpackets, embedding fields, check sequences, or any generic field of a packet may not necessarily be contiguous and may occupy different levels or sublevels of a packet. Therefore alternate embodiments of the invention include other such possible contiguous and non-contiguous variations to the regions described in the main embodiments described herein.

The application refers to copying, embedding, inserting, replacing, etc. as descriptive but generically equivalent phrases to refer to act of setting one or more states of a packet, buffer, field, memory region, etc. Therefore, it is to be clearly recognized that no further action is either implied or intended by using descriptive phrases when referring to the act of setting one or more states of a packet, buffer, memory region, etc.

Those in the art will understand that there are many variations of the implementation of the apparatus shown in FIG. 1, which is incorporated into many aspects of the present invention. There has not been an attempt to describe all possible variations and as such, it should be appreciated that many common variations, derivatives and modifications exist. Therefore, all such variations, derivatives and modifications are hereby incorporated as alternate embodiments of the present invention.

It is well known in the art that there are many variations and derivatives of the general polynomial (CRC) coding method. Many polynomial (CRC) coding standards have been established in the art. Examples of some CRC coding standards include CRC-8, CRC-12, CRC-16, CRC-CCITT, XMODEM-CRC and CRC-32. Embodiments of the invention may make reference to one or more polynomial (CRC) code methods. Although polynomial (CRC) code standards exist, embodiments of the present invention are not limited to any particular polynomial (CRC) code standard, nor are they limited to any particular variation of derivative of the general polynomial coding method. Thus all such variations and derivatives are hereby incorporated as alternate embodiments of the invention.

In several embodiment of the invention, the wireless network and/or the packets being transmitted/received over the wireless network substantially conform to an OFDM variant of the IEEE 802.11 standard or a derivative thereof. It is well known in the art that the invention is not limited to such contexts and may be utilized in various wireless network applications and systems. Furthermore, embodiments or aspects of the invention are not limited to any one type of architecture or protocol, and thus, may be utilized in conjunction with one or a combination of other architectures/protocols. For example, the invention may be embodied in devices conforming to other standards and for other applications, including other WLAN standards, Bluetooth, IrDA, and other wireless communication standards. Thus, all such contexts are hereby incorporated as alternate embodiments of the invention.

One embodiment of each of the methods described herein is in the form of a computer program that executes on a processing system, e.g., one or more processors that are part of wireless station of a wireless network. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer readable medium may be used including a magnetic storage device such as a diskette or a hard disk, or an optical storage device such as a CD-ROM.

It will be understood that the steps of methods discussed are performed in one embodiment by an appropriate processor (or processors) of a processing (e.g., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

It should further be appreciated that although the invention has been described in the context of wireless networks, the invention is not limited to such contexts and may be utilized in various other applications and systems, for example in a node of a cellular phone network or in a system that uses radio transmission to communicate via satellite. Furthermore, the invention is not limited to any one type of network architecture and method of encapsulation, and thus may be utilized in conjunction with one or a combination of other network architectures/protocols.

All publications, patents, and patent applications cited herein are hereby incorporated by reference.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method in a first wireless station of a wireless network, the method comprising:
    generating a check sequence to protect the integrity of a subpacket of a packet, wherein the packet is to be wirelessly transmitted;
    embedding the check sequence in an embedding field within the packet, wherein the embedding field is located prior to the end of the subpacket; and
    wirelessly transmitting the packet,
wherein the check sequence is generated such that a second wireless station wirelessly receiving a signal corresponding to the packet can sequentially verify the integrity of the subpacket as if the check sequence were appended at the end of the subpacket being protected.

2. A method as recited in claim 1, wherein the generating comprises:
    computing an appended check sequence of the subpacket; and
    multiplying the appended check sequence by a re-positioning matrix to determine the check sequence.

3. A method as recited in claim 1, wherein the method further comprises setting at least one bit of the packet such that the second wireless station can ascertain whether there the check sequence is in the packet.

4. A method as recited in claim 1, wherein the generating includes a calculation substantially conforming to a polynomial code checksum calculation.

5. A method as recited in claim 1, wherein the packet substantially conforms to one of the OFDM variants of the IEEE 802.11 standard or a derivative thereof, and
    wherein the packet includes a SERVICE field, a PLCP header and a MAC header.

6. A method as recited in claim 5, wherein the embedding field includes at least one bit of the SERVICE field, and
    wherein the subpacket includes at least one bit of a PLCP header and at least one bit of the MAC header.

7. A method as recited in claim 6, wherein the generating includes a calculation substantially conforming to a polynomial code checksum calculation, and
    wherein the polynomial code checksum calculation uses a generator polynomial of $x^8+x^2+x+1$.

8. A first method in a first wireless station of a wireless network, the first method comprising:
- wirelessly receiving a signal corresponding to a packet wirelessly transmitted by a second wireless station, wherein the packet includes a subpacket and a check sequence, wherein the check sequence is in an embedding field within the packet, wherein the embedding field is located prior to the end of the subpacket; and
- verifying the integrity of the subpacket, the verifying at least using the check sequence; and
- wherein the check sequence was generated by a second method in the second wireless station comprising:
- generating a check sequence to protect the integrity of a subpacket;
- embedding the check sequence in the embedding field; and
- wirelessly transmitting the packet, wherein the check sequence is generated such that the first wireless station can sequentially verify the integrity of the subpacket as if the check sequence were appended at the end of the subpacket being protected as if the check sequence were appended at the end of the subpacket being protected.

9. A first method as recited in claim 8, wherein the generating in the second method comprises:
- computing an appended check sequence of the subpacket; and
- multiplying the appended check sequence by a re-positioning matrix to determine the check sequence.

10. A first method as recited in claim 8, wherein the first method further comprises ascertaining whether the check sequence is in the packet, the ascertaining at least using at least one bit of the packet.

11. A first method as recited in claim 8, wherein the verifying in the first method includes a calculation substantially conforming to a polynomial code checksum calculation.

12. A first method as recited in claim 8, wherein the packet substantially conforms to one of the OFDM variants of the IEEE 802.11 standard or a derivative thereof, and
- wherein the packet includes a SERVICE field, a PLCP header and a MAC header.

13. A first method as recited in claim 12, wherein the embedding field includes at least one bit of the SERVICE field, and
- wherein the subpacket includes at least one bit of a PLCP header and at least one bit of the MAC header.

14. A first method as recited in claim 13, wherein the verifying in the first method includes a calculation substantially conforming to a polynomial code checksum calculation, and
- wherein the polynomial code checksum calculation uses a generator polynomial of $x^8+x^2+x+1$.

15. An apparatus in a first wireless station of a wireless network, the apparatus comprising:
- a processing unit including a wireless transceiver coupled to an antenna, the processing unit arranged to wirelessly transmit a packet, wherein the packet includes a subpacket, and
- a check sequence generator coupled to the processing unit, the check sequence generator arranged:
  - to generate a check sequence to protect the integrity of the subpacket; and
  - to embed the check sequence in an embedding field within the packet,
- wherein the check sequence is generated such that a second wireless station wirelessly receiving a signal corresponding to the packet can sequentially verify the integrity of the subpacket as if the check sequence were appended at the end of the subpacket being protected.

16. An apparatus as recited in claim 15, wherein the apparatus further comprises a multiplier unit coupled to the check sequence generator, the multiplier unit arranged:
- to compute an appended check sequence of the subpacket; and
- to multiply the appended check sequence by a re-positioning matrix to determine the check sequence.

17. An apparatus as recited in claim 16,
- wherein the multiplier unit includes an array of one or more XOR trees.

18. An apparatus as recited in claim 15, wherein the apparatus further comprises an indicator unit coupled to the processing unit, the indicator unit arranged to set at least one bit of the packet such that the second wireless station can ascertain whether the check sequence is in the packet.

19. An apparatus as recited in claim 15, wherein the apparatus further comprises an indicator unit coupled to the check sequence generator, the indicator unit arranged to set at least one bit of the packet such that the second wireless station can ascertain whether the check sequence is in the packet.

20. An apparatus as recited in claim 15, wherein the check sequence generator is further arranged to include a calculation substantially conforming to a polynomial code checksum calculation.

21. An apparatus as recited in claim 15, wherein the packet substantially conforms to one of the OFDM variants of the IEEE 802.11 standard or a derivative thereof, and
- wherein the packet includes a SERVICE field, a PLCP header and a MAC header.

22. An apparatus recited in claim 21, wherein the embedding field includes at least one bit of the SERVICE field, and
- wherein the subpacket includes at least one bit of a PLCP header and at least one bit of the MAC header.

23. An apparatus as recited in claim 22, wherein the check sequence generator is further arranged to include a calculation substantially conforming to a polynomial code checksum calculation, and
- wherein the polynomial code checksum calculation uses a generator polynomial of $x^8+x^2+x+1$.

24. An apparatus in a first wireless station of a wireless network, the apparatus comprising:
- a processing unit including a wireless transceiver coupled to an antenna, the processing unit arranged to wirelessly receive a signal corresponding to a packet wirelessly transmitted by a second wireless station, wherein the packet includes a subpacket and a check sequence; wherein the check sequence in an embedding field within the packet, wherein the embedding field is located prior to the end of the subpacket; and
- a subpacket verifier coupled to the processing unit arranged to verify the integrity of the subpacket, the verifying at least using the check sequence, wherein the check sequence was generated by a second method in the second wireless station comprising:
- generating a check sequence to protect the integrity of a subpacket;
- embedding the check sequence in the embedding field; and
- wirelessly transmitting the packet, wherein the check sequence is generated such that the first wireless station can sequentially verify the integrity of the subpacket as if the check sequence were appended at the end of the subpacket being protected.

25. An apparatus recited in claim 24, wherein the generating in the second method comprises:
  computing an appended check sequence of the subpacket; and
  multiplying the appended check sequence by a re-positioning matrix to determine the check sequence.

26. An apparatus as recited in claim 24, wherein the apparatus further comprises a check sequence detector coupled to the subpacket verifier, the check sequence detector arranged to ascertain whether the check sequence is in the packet, the ascertaining at least using at least one bit of the packet.

27. An apparatus as recited in claim 24, wherein the subpacket verifier is further arranged to include a calculation substantially conforming to a polynomial code checksum calculation.

28. An apparatus as recited in claim 24, wherein the packet substantially conforms to one of the OFDM variants of the IEEE 802.11 standard or a derivative thereof, and
  wherein the packet includes a SERVICE field, a PLCP header and a MAC header.

29. An apparatus recited in claim 28, wherein the embedding field includes at least one bit of the SERVICE field, and
  wherein the subpacket includes at least one bit of a PLCP header and at least one bit of the MAC header.

30. An apparatus as recited in claim 29, wherein the subpacket verifier is further arranged to include a calculation substantially conforming to a polynomial code checksum calculation, and
  wherein the polynomial code checksum calculation uses a generator polynomial of $x^8+x^2+x+1$.

31. A carrier medium including one or more computer readable code segments to instruct one or more processors of a processing system to implement a method in a first wireless station of a wireless network, the method comprising:
  generating a check sequence to protect the integrity of a subpacket of a packet, wherein the packet is to be wirelessly transmitted;
  embedding the check sequence in an embedding field within the packet, wherein the embedding field is located prior to the end of the subpacket; and
  wirelessly transmitting the packet,
wherein the check sequence is generated such that a second wireless station wirelessly receiving a signal corresponding to the packet can sequentially verify the integrity of the subpacket as if the check sequence were appended at the end of the subpacket being protected.

32. A carrier medium as recited in claim 31, wherein the packet substantially conforms to one of the OFDM variants of the IEEE 802.11 standard or a derivative thereof, and
  wherein the packet includes a SERVICE field, a PLCP header and a MAC header.

33. A carrier medium as recited in claim 32, wherein the embedding field includes at least one bit of the SERVICE field, and
  wherein the subpacket includes at least one bit of a PLCP header and at least one bit of the MAC header.

34. A carrier medium as recited in claim 33, wherein the generating includes a calculation substantially conforming to a polynomial code checksum calculation, and
  wherein the polynomial code checksum calculation uses a generator polynomial of $x^8+x^2+x+1$.

35. An apparatus in a first wireless station of a wireless network, the apparatus comprising:
  means for generating a check sequence to protect the integrity of a subpacket of a packet, wherein the packet is to be wirelessly transmitted;
  means for embedding the check sequence in an embedding field within the packet, wherein the embedding field is located prior to the end of the subpacket; and
  means for wirelessly transmitting the packet,
wherein the check sequence is generated such that a second wireless station wirelessly receiving a signal corresponding to the packet can sequentially verify the integrity of the subpacket as if the check sequence were appended at the end of the subpacket being protected.

36. An apparatus as recited in claim 35, wherein the packet substantially conforms to one of the OFDM variants of the IEEE 802.11 standard or a derivative thereof, and
  wherein the packet includes a SERVICE field, a PLCP header and a MAC header.

37. An apparatus recited in claim 36, wherein the embedding field includes at least one bit of the SERVICE field, and
  wherein the subpacket includes at least one bit of a PLCP header and at least one bit of the MAC header.

38. An apparatus as recited in claim 37, wherein the means for generating includes a calculation substantially conforming to a polynomial code checksum calculation, and
  wherein the polynomial code checksum calculation uses a generator polynomial of $x^8+x^2+x+1$.

* * * * *

UNITED STATES PATENT AND TRADEMARK OFFICE
CERTIFICATE OF CORRECTION

PATENT NO. : 7,055,086 B2
APPLICATION NO. : 10/819771
DATED : May 30, 2006
INVENTOR(S) : Lam

It is certified that error appears in the above-identified patent and that said Letters Patent is hereby corrected as shown below:

In column 15, line 41, kindly change "apparatus 1" to --apparatus 1000--.

Signed and Sealed this

Twenty-ninth Day of August, 2006

JON W. DUDAS
*Director of the United States Patent and Trademark Office*